(12) United States Patent
Leuciuc et al.

(10) Patent No.: US 9,039,074 B1
(45) Date of Patent: May 26, 2015

(54) WHEEL LINER APPARATUS

(71) Applicants: Dan Leuciuc, Kimball, MI (US); Alexandru Oltean, Targu (RO)

(72) Inventors: Dan Leuciuc, Kimball, MI (US); Alexandru Oltean, Targu (RO)

( * ) Notice: Subject to any disclaimer, the term of this patent is extended or adjusted under 35 U.S.C. 154(b) by 0 days.

(21) Appl. No.: 13/705,165

(22) Filed: Dec. 4, 2012

(51) Int. Cl.
*B62D 25/16* (2006.01)

(52) U.S. Cl.
CPC .............. *B62D 25/163* (2013.01); *B62D 25/16* (2013.01)

(58) Field of Classification Search
CPC .............................. B62D 25/16; B62D 25/161
USPC .......... 296/198, 39.1, 39.3; 280/849, 850, 851
See application file for complete search history.

(56) References Cited

U.S. PATENT DOCUMENTS

| | | | |
|---|---|---|---|
| 2004/0135362 A1* | 7/2004 | Banry et al. ................... | 280/847 |
| 2006/0103171 A1* | 5/2006 | Blomeling et al. ........... | 296/204 |
| 2007/0065628 A1* | 3/2007 | Allison et al. ................. | 428/95 |
| 2008/0203751 A1* | 8/2008 | Wildhaber ..................... | 296/39.3 |
| 2011/0214568 A1* | 9/2011 | Krantz ............................. | 95/273 |

FOREIGN PATENT DOCUMENTS

| | | |
|---|---|---|
| DE | 19817567 A1 * | 11/1999 |
| FR | 2816266 A1 * | 5/2002 |

OTHER PUBLICATIONS

Machine translation of DE19817567A1, printed from the EPO website Aug. 12, 2014.*

* cited by examiner

*Primary Examiner* — Jason S Morrow

(57) ABSTRACT

A wheel liner comprises a rigid frame with relatively large openings rather than a continuous surface. Non-woven fibers or potential other similar materials which are often less rigid than the frame are inserted over the openings of the frame. The resulting wheel liner is less expensive, lighter, more aesthetically pleasing, and possessing superior sound dampening capabilities than a conventional prior art wheel liner.

20 Claims, 12 Drawing Sheets

WHEEL LINER APPARATUS

BACKGROUND OF THE INVENTION

The invention relates generally to liners used to prevent the intrusion of dust, mud, water, and other forms of debris (collectively "debris"). More specifically, the invention is a wheel liner apparatus (the "apparatus") for use in a vehicle.

Vehicles use wheel liners for purposes of function as well as aesthetics. Wheel liners in the front of the vehicle can be used to keep debris from entering the engine compartment. Wheel liners in the rear of the vehicle can be used to keep debris outside of the deep body areas of the vehicle. Wheel liners can also impact the aesthetic appearance of the vehicle exterior as well as dampen sounds that would otherwise be experienced within the engine compartment of the vehicle.

Traditional Wheel Liner.

A traditional wheel liner is typically comprised of plastic that is either injection molded or thermoformed. Such a wheel liner is typically attached to the wheel areas of the vehicles through commercially standard attachment configurations. Unfortunately, the traditional wheel liner can result in an unacceptably noisy experience for human beings in the interior of the vehicle. Such wheel liners can also be aesthetically unattractive, diminishing the styling and aesthetic qualities of the vehicle.

Non-Woven Over-Patch.

One approach to addressing the problems a traditional wheel liner in the prior art is to add non-woven sound proofing patches on top of the surfaces of the wheel liner. While such an approach can effectively address the sound and aesthetic issues, the approach also results in extra weight as well as extra material costs as the wheel liner possess a double surface for much of the liner. Securely fastening the non-woven surface over substantially all of the thermoformed plastic wheel liner can complicate the manufacturing process and make it substantially more expensive as the conventional wheel liner can possess a largely irregular surface and the response of the underlying plastic frame to heat and other manufacturing processes may be distinctly different to the fiber or fabric inserts.

Non-Woven Structure.

Another alternative approach to the tradeoffs involving wheel liners is to replace the plastic structure of the wheel liner in its entirely and instead create a stand-alone structure using the non-woven material instead of using patches of such material on top of such a structure. This approach involves a substantially higher materials and manufacturing cost. Moreover, such an approach raises the requirements of non-standard additional mounting points.

In some ways, the inventive apparatus can be characterized as a non-obvious hybrid combination of all three of the prior art approaches outlined above. The combination is not obvious in light of the prior art for several reasons. The approach is counterintuitive with respect to the teachings of the prior art while enjoying synergistic results. For example, modularity is not a goal that the prior art is generally cognizant of in the context of wheel liners. Prior art manufacturing processes also teach away from the hybrid approach of the innovative apparatus. The desire to minimize costs also discourages experimentation with regards to the inventive approach.

The apparatus is described in greater detail below in the Summary of the Invention section.

SUMMARY OF THE INVENTION

The invention relates generally to liners used to prevent the intrusion of dust, mud, water, and other forms of debris (collectively "debris"). More specifically, the invention is a wheel liner apparatus (the "apparatus") for use in a vehicle.

The apparatus is relatively rigid frame that includes various openings that are covered by relatively less-rigid non-woven fiber or fabric inserts. The combination of elements will allow the apparatus to keep debris outside of the vehicle while dampening the magnitude of vehicle noise that can be detected from within the passenger compartment of the vehicle. The apparatus can also sustain the aesthetic desirability of the vehicle, while utilizing a rigid frame to sustain the structural integrity of the apparatus.

The apparatus can be more fully understood upon reading the accompanying drawings that are discussed briefly below.

BRIEF DESCRIPTION OF THE DRAWINGS

The following drawings illustrate different examples and embodiments of the apparatus.

The wheel liner apparatus can be better understood in reference to the Detailed Description section set forth below.

DETAILED DESCRIPTION

The invention relates generally to liners used to prevent the intrusion of dust, mud, water, and other forms of debris (collectively "debris"). More specifically, the invention is a wheel liner apparatus (the "apparatus") for use in a vehicle.

A wheel liner comprises a rigid frame with relatively large openings rather than a continuous surface. Non-woven fibers or potentially other similar materials which are often less rigid than the frame are positioned over the openings of the frame. The resulting wheel liner is less expensive, lighter, more aesthetically pleasing, and possessing superior sound dampening capabilities than a conventional prior art wheel liner. The wheel liner typically possesses an irregular shape.

I. DEFINITIONS AND INTRODUCTION OF ELEMENTS

Figure 1:
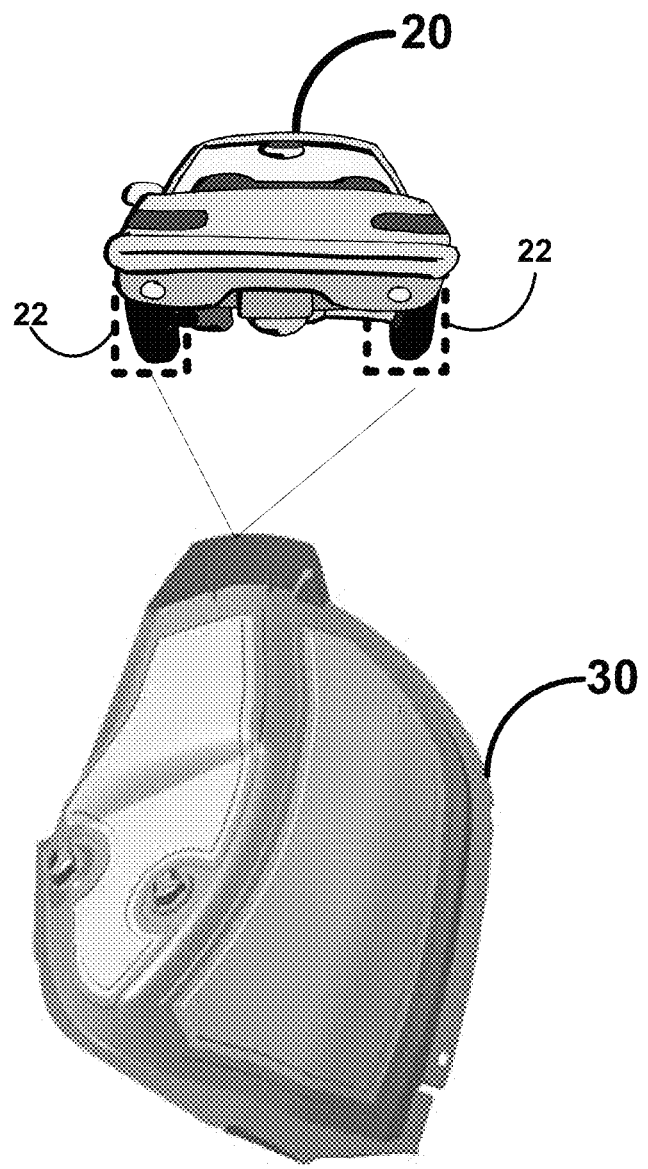
FIG. 1 is an environmental diagram illustrating an example of a wheel liner apparatus and rear wheel locations on a vehicle.

FIG. 1 is an environmental diagram illustrating an example of a wheel liner apparatus 30 and a vehicle 20 with a variety of wheel areas 32.

A. Vehicle and Environmental Components

Figure 5:
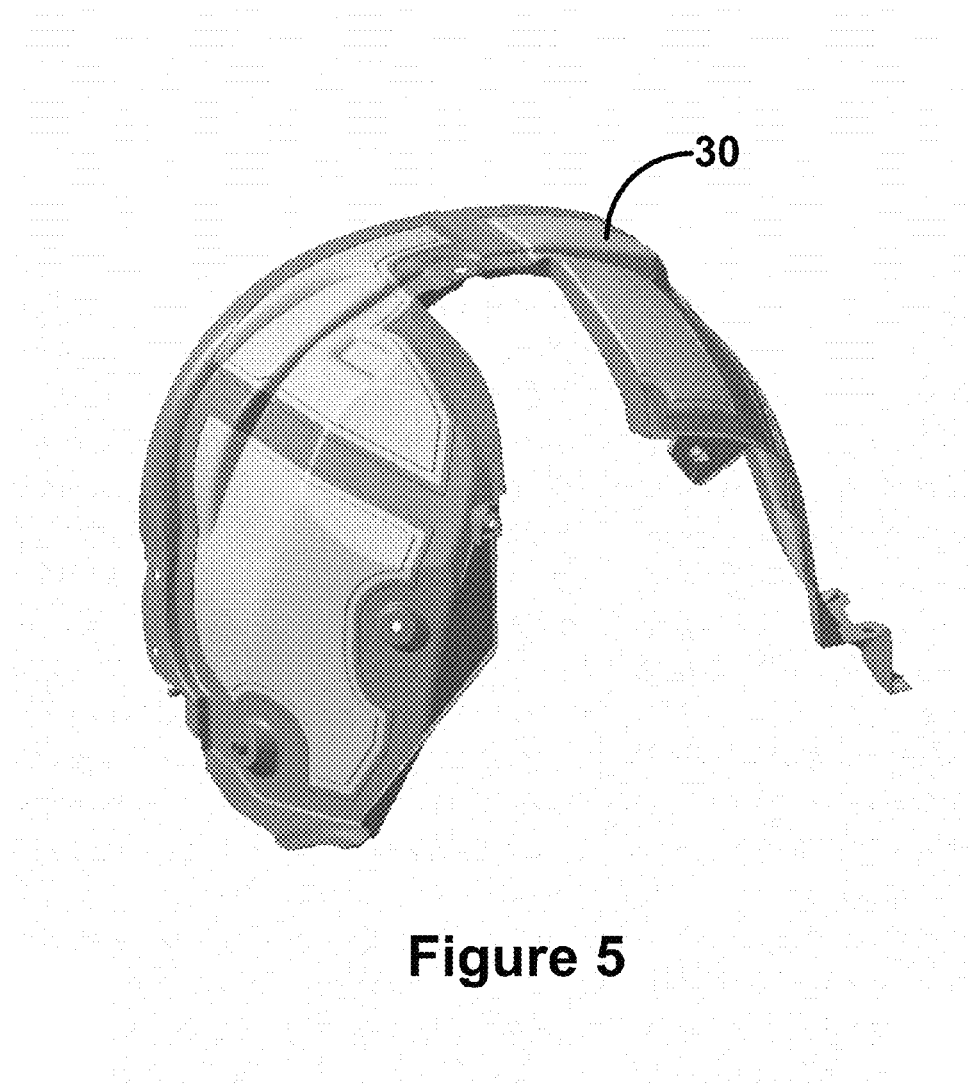
FIG. 5 is a perspective view diagram illustrating an example of a wheel apparatus for use with a front wheel.

A wide variety of different wheel liner apparatuses 30 can be used in conjunction with a wide variety of different vehicles 20. Certain design attributes of the apparatus 30 will be impacted by the wheel areas 22 of the vehicle 20 on which the apparatus 30 is to be used. In most operational contexts, the apparatuses 30 used in conjunction with the front wheels of the vehicle 20 will be different that the apparatuses 30 used in conjunction with the rear wheels of the vehicle 20. The apparatus 30 illustrated in FIG. 1 is intended for use in conjunction with rear wheels, while the apparatus 30 illustrated in FIG. 5 is intended for use with front wheels. Different vehicles 20 will involve different wheel area 32 geometries and other configurations.

The apparatus 30 can be implemented in a manner that is fully compatible with existing prior art wheel liners such that the apparatus 30 can be used to replace prior art wheel liners. Compatibility of the apparatus 30 is achieved by including a compatible mating geometry in the apparatus 30 to facilitate installment of the apparatus 30 within the vehicle 20.

1. Vehicle

Returning to FIG. 1, the apparatus 30 can be installed in a wide variety of different vehicles 20. Examples of vehicles 20 that can benefit from use of the apparatus 30 include cars, trucks, SUVs, and any other type of vehicle that uses a prior art wheel liner apparatus. The apparatus 30 can be particularly desirable in a context where performance, weight, aesthetics, noise dampening, shape, modularity, and cost are each important. An area of the vehicle 20 in which the apparatus 30 is attached is a wheel area 22.

2. Wheel Area

The apparatus 30 is applied within the wheel area 22 of a vehicle 20. The apparatus 30 can be securely but removeably fixed to the wheel area 22 using an attachment component 46 or a configuration of multiple attachment components 46 (see FIG. 3) on the apparatus 30 that is secured with respect to an connection point in the wheel area 22 of the vehicle 20. As discussed above, the apparatus 30 can be implemented in such a way as to be compatible (i.e. interchangeable) with prior art wheel liner apparatuses with the apparatus 30 because (a) the apparatus 30 can possess a shape that is compatible with the wheel area 22 and prior art liners and (b) the apparatus 30 can possess attachment components 46 that are compatible with the corresponding connection points in the wheel area 22.

3. Connection Points

Connection points are connectors in the wheel area 22 of the vehicle 20 that are designed to mate with the attachment components 46 on the apparatus 30 to securely fix the apparatus 30 to the vehicle 20. The apparatus 30 can be configured to be installed in virtually any prior configuration of connection points. In a preferred embodiment of the apparatus 30, conventional "industry standard" connection points are used to secure the position of the apparatus 30 with respect to the wheel area 22. Connection points are typically constructed of a material similar to the material of the attachment components 46, which will often be some form of plastic. The number of connection points and mating attachment components 46 will typically differ with respect to front wheel applications and rear wheel applications as well as between different types of vehicles 20. Such variations also exist in the prior art, and the apparatus 30 can be implemented in a manner that is fully compatible with prior art liners and wheel areas 22.

B. Apparatus and its Component Parts

The apparatus 30 can be implemented in a wide variety of alternative embodiments for use in a wide variety of different vehicle environments. In many instances, embodiments of the apparatus 30 will differ based on whether the apparatus 30 is used for the front wheel of the vehicle 20 or for the rear wheel of the vehicle 20.

Although front and rear wheel apparatuses 30 can be configured differently with respect to shape, size, geometry, number of openings 44, number of attachment components 46, etc. to fit in their respective wheel areas 22, the various elements of the apparatus 30 can be defined and described generically with respect to both front and rear wheel applications.

Figure 2:
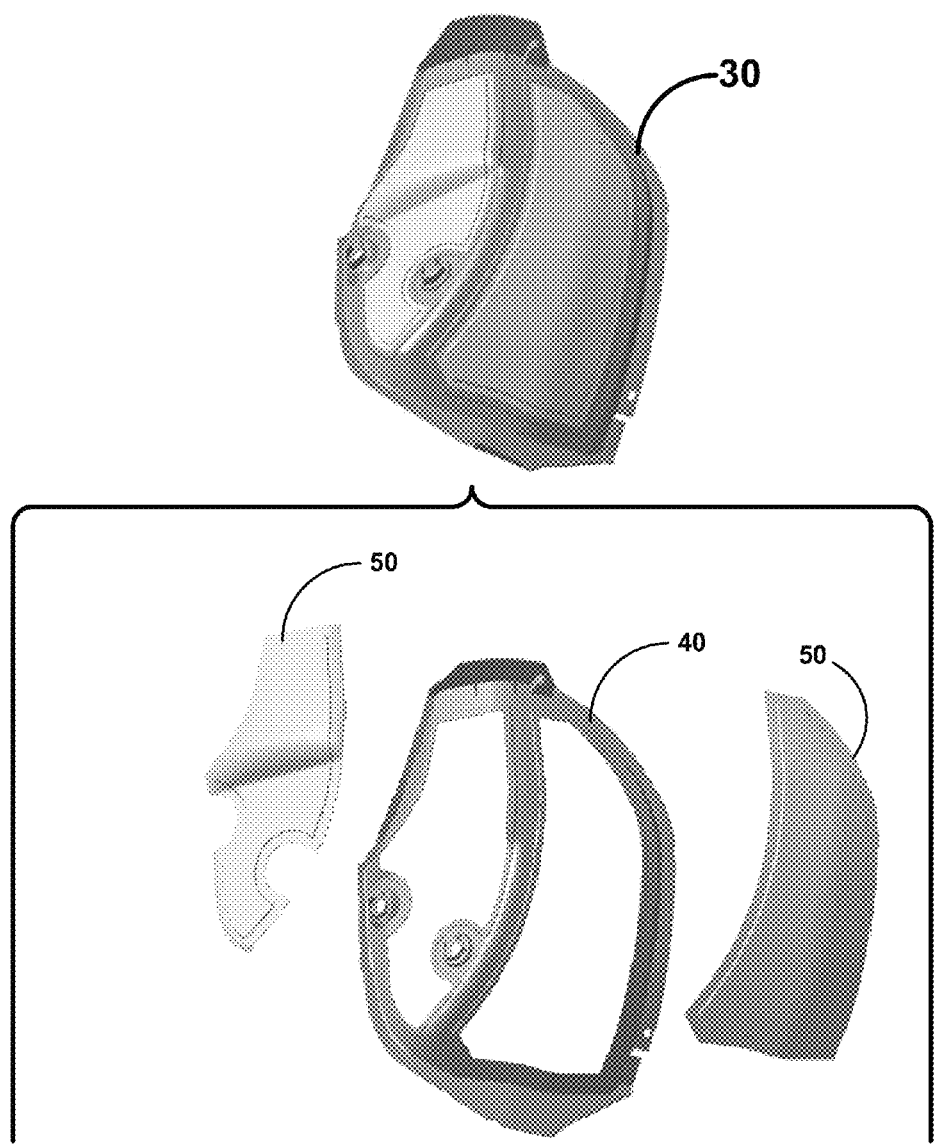
FIG. 2 is diagram illustrating an example of a front exploded view of a wheel liner apparatus and its component frame and inserts.

FIGS. 1-4 illustrate examples of an apparatus 30 or its component parts for use with rear wheels of the vehicle 20. FIGS. 5-8 illustrate examples of the apparatus 30 or its component parts for use with front wheels of the vehicle 30. As indicated by the various Figures, differences exist between front and rear embodiments of the apparatus 30, but both categories of embodiments are comprised of a similar list of components. As illustrated in FIG. 2, the two primary components of the apparatus 30 are a frame 40 and an insert 50.

1. Frame

Figure 3:
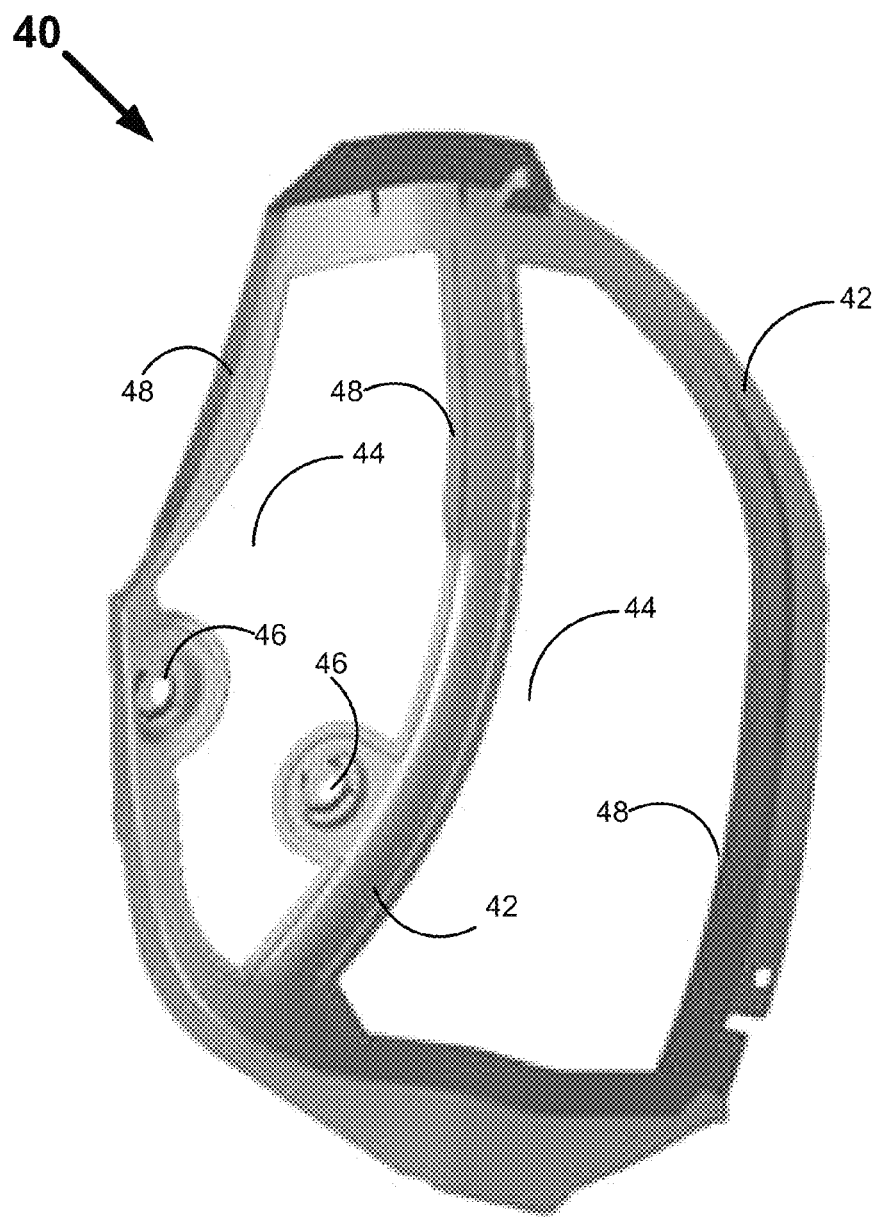
FIG. 3 is diagram illustrating an example of a frame without any inserts.

A frame 40 is the substantially rigid body that shapes the apparatus 30. In many instances, the frame 40 is comprised of a plastic, typically a thermoformed injection molded plastic. A frame 40 can be comprised of a wide variety of different materials or material combinations, but will in most instances be at least relatively more rigid that the material comprising the inserts 50. The frame 40 is a subassembly of various components serving different functions. FIG. 3 illustrates an example of a frame 40, and various components comprising the frame 40.

a. Member

A frame 40 is combination of one or more members 42. In FIG. 3, the frame 40 is comprised of three members 42 connected together at the top and bottom of the frame 40. Rear wheel embodiments of the apparatus 30 will typically have between two and four members 42, with a preferred embodiment utilizing three members 42. Front wheel embodiments of the apparatus 30 will typically be comprised of two distinct subassemblies of members 42, with each subassembly typically including between two and six members 42.

b. Opening

An opening 44 is a space within the frame 40 between the various members 42 of the frame 40. The opening 44 is the space within the frame that an insert 50 covers. A rear wheel embodiment of the apparatus 30 will typically have two openings 44 and two corresponding inserts 50 with alternative embodiments having a range between about 1 and 4 openings 44. A front wheel embodiment of the apparatus 30 will typically have four openings 44 and four corresponding inserts 50, with alternative embodiments having a range between about 1 and 8 openings 44.

c. Attachment Components

One of the functions of the frame 40 is to provide the apparatus 30 with the ability to be secured into a fixed position within the wheel area 22. An attachment component 46 is a component of the frame 40 that mates with a corresponding connection point on the wheel area 22 of the vehicle 20. Any prior art technology of securing a prior art wheel liner apparatus on a vehicle 20 can be used as an attachment component 46 for the apparatus 30. A wide variety of different technologies can be incorporated into the apparatus 30 as attachment components 46. Attachment components 46 allow the apparatus 30 to be compatible with prior art wheel liners because the configuration of attachment components 46 of the apparatus 30 can correspond to similar mechanisms on prior art wheel liners.

d. Boundary Surface

The apparatus 30 is comprised of a frame 40 that is connected to one or more inserts 50. A boundary surface 48 is the area on the frame 40 that is directly mated with an overlap surface 52 on the insert 50. The bonding between the boundary surface 48 of the frame 40 and the overlap surface 52 of the insert 50 keeps the apparatus 30 as a unified whole when the apparatus 30 is installed and used on the vehicle 20. The bonding between the boundary surface 48 of the frame 40 and the overlap surface 52 of the insert 50 is typically intended to be permit. In a preferred embodiment, the frame 40 is over-molded onto the insert 50. The bonding between the frame 40 and insert 50 can increase the performance of the apparatus 30.

2. Insert

Figure 4:
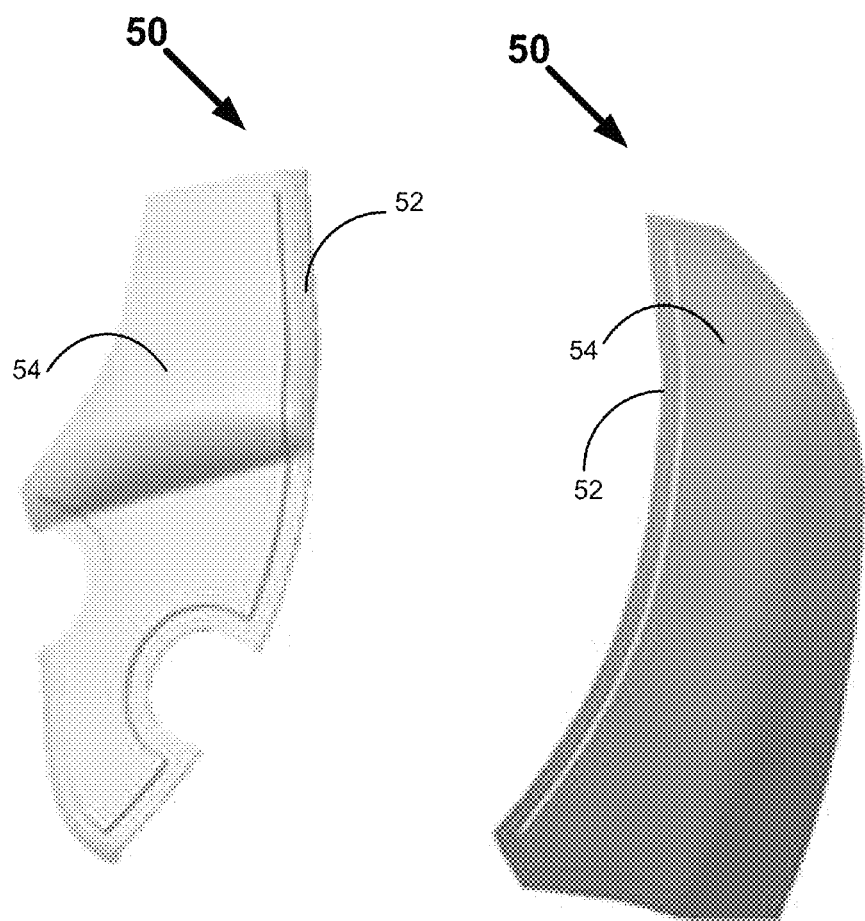
FIG. 4 is a diagram illustrating an example of two inserts that are shaped to be used with the frame illustrated in FIG. 3.

FIG. 4 illustrates an example of inserts 50 that correspond to the frame 40 illustrated in FIG. 3. An insert 50 (which can also be referred to as an insert component 50, patch 50 or overlay 50), is a component that covers an opening 44. Inserts 50 can be comprised of a variety of different materials, but in a preferred environment, are comprised of a non-woven light texture fabric material. A multi-cavity tool can be used to form the various inserts 50 used in a particular embodiment of the apparatus 30. An insert 50 can be divided into two sub-components, an insert body 54 and an insert border 52 (which can also be referred to as an overlap surface 52). Inserts 50 can be comprised of a wide variety of different materials, including in some embodiments between 40-60% vegetal renewable fiber or a wide range of different non-woven raw material.

a. Insert Body

The main body 54 of the insert 50 is the portion of the insert 50 that does not overlap with the frame 40. The insert body 54 will typically comprise the vast majority of the insert 50.

b. Overlap Surface

The overlap surface 52 of the insert 50 is the portion of the insert 50 that overlaps with the boundary surface 48 of the frame 40. In many embodiments, the frame 40 is actually formed directly on the overlap surface 52 of the insert 50.

II. OVERVIEW

The apparatus 30 can be configured and implemented in such a manner as to be perform the function of keeping out mud, water, dirt, snow, stones, water and other debris (collectively the "debris") outside the engine compartment (in the case of front wheel liners) and deep body areas of the vehicle (in the case of rear wheel liners).

The apparatus 30 can also perform the secondary functions of dampening the noise perceived from within the occupant area of the vehicle 20 and while conveying a desirable aesthetic appearance to observers positioned outside the vehicle 20. Rather than seeing mechanical parts and different components of the vehicle 20, such parts and components are tucked in the back of the apparatus 30 that ultimately provides a nice looking, continuous surface. The noise of the wheels running (i.e. turning) is amplified and transferred inside the vehicle 20, therefore the ability of the apparatus 30 to improve the sound proofing of the inside of the vehicle is material function.

In addition to the considerations mentioned above, there is also an advantage to reducing weight for components. Use of the apparatus 30 as a replacement for prior art lines allows the apparatus 30 to replace heavier parts with lighter materials.

The apparatus 30 is an improved solution over the prior art. The apparatus 30 combines the advantages of prior previous designs while reducing/eliminating the negative aspects. The hybrid approach for the apparatus 30 is completely interchangeable with the traditional, plastic-only design and therefore the number of attachment points on the vehicles 20 is unchanged and kept to a minimum (compared with the non-woven only solution). The apparatus 30 provides opportunity for weight savings as most of the part surface is moved from hard plastic towards the non-woven material. The apparatus 30 can use rigid material such as hard plastic in key areas allows for the same overall part rigidity and consistency while allowing for the use of less rigid materials for the inserts 50. As the amount of rigid material is reduced and optimized, the overall cost of the apparatus 30 gets significantly lower than the non-woven only option.

The apparatus 30 represents an innovative solution pertaining to the interface between the non-woven inserts 50 and the hard plastic frame 40. This interface accommodates overlapping of the two materials and a consequential thickness variation. The thickness variation allows for improved manufacturability of the assembly, compensating for tolerance spread of components as well as positioning variations. Another feature that can be incorporated into the apparatus 30 pertains to insert handling and positioning in the over-molding tool, allowing the frame 40 to be molded around the applicable insert 50. The innovative apparatus 30 can be created using a manufacturing process that includes retention features in the mold that allow for proper insert holding prior to the over-molding cycle.

By using a plastic frame 40 in conjunction with less rigid non-woven inserts 50 the aggregate result for the apparatus 30 is desirable tradeoff between the benefits structural strength and flexibility. The apparatus 30 can be characterized as a non-obvious combination of certain aspects found in existing prior art wheel liners. The apparatus 30 is contrasted with the plastic, plastic+patch, and non-woven liners below. The manufacturing process that can be used to create a preferred embodiment of the apparatus 30 and prior art teachings regarding conflicting tradeoffs that affirmatively teach away from the apparatus 30 render the apparatus both novel and non-obvious.

A. Apparatus vs. Traditional Plastic Wheel Liner

A traditional wheel liner is typically comprised of plastic ("plastic liner") that is either injection molded or thermo-formed. Such a wheel liner is typically attached to the wheel areas of the vehicles through commercially standard attachment configurations. Unfortunately, the traditional wheel liner can result in an unacceptably noisy experience for human beings in the interior of the vehicle. Such wheel liners can also be aesthetically unattractive, diminishing the styling and aesthetic qualities of the vehicle.

Unlike a traditional plastic liner, the apparatus 30 utilizes the plastic material for the frame 40, not the entire apparatus 30. The openings on the frame 40 are filled with the non-woven insert 50. The apparatus 30 can be aesthetically superior, 15-30% lighter, and 2-3 dB less noisy than a traditional plastic liner, while being only 40-60% as expensive.

B. Apparatus vs. Non-Woven Over-Patch

One alternative prior art approach is the use of non-woven patches on top of a traditional plastic liner ("plastic+patch liner"). The non-woven patches are added on to the traditional apparatus, making this alternative more expensive and heavier than a traditional plastic liner. While such an approach can effectively address the sound and aesthetic issues, the approach also results in extra weight as well as extra material costs as the wheel liner possess a double surface for much of the liner. Securely fastening the non-woven surface over substantially all of the thermoformed plastic wheel liner can complicate the manufacturing process and make it more expensive as the conventional wheel liner can possess a largely irregular surface and the response of the underlying plastic frame to heat and other manufacturing processes may be distinctly different to the fiber or fabric inserts.

In contrast, the apparatus 30 uses only a plastic frame 40 that includes substantial openings 44 covered by non-woven inserts 50. The apparatus 30 is thus aesthetically equivalent to a plastic+patch liner while having 15-30% less mass, a mere 1 dB decrease in sound dampening coupled with a 50% reduction in cost.

C. Apparatus v. Non-Woven Structure

Another alternative approach to the tradeoffs involving wheel liners is to replace the plastic structure of the wheel liner in its entirely and instead create a stand-alone structure using the non-woven material instead of using patches of such material on top of a plastic structure ("non-woven liner"). This approach involves a substantially higher materials and manufacturing cost. Moreover, such an approach raises the requirements of non-standard additional mounting points.

By utilizing a plastic frame 40, the apparatus 30 is 50% less expensive than a non-woven structure, while possessing the same sound dampening and aesthetic qualities. The apparatus 30 is somewhat heavier than an equivalent non-woven liner, but the hybrid design provides for complete interchangeability with plastic liners because installment of the non-woven liners requires a greater number of attachment components and connection points.

D. Additional Attributes of the Apparatus

Varying the geometry of the non-woven inserts 50 allows for greater flexibility in the manufacturing of the apparatus 30 because the frame 40 can be molded around the inserts 50 (i.e. the geometry of the inserts 50 can be specified while keeping in mind the tool position for the mold over plastic used to create the frame 40). This design in return allows for increased manufacturability of the apparatus 30 in regular production environment, eliminating the need for very precise, high tolerance inserts 50. In a preferred embodiment of the apparatus 30, there is overlap between the frame 40 and the insert 50. The overlapped areas (the overlap surface 52 of the insert 50 and the boundary surface 48 of the frame) allow for improved bonding between the two materials of the frame 40 and insert 50, increasing the overall performance of the resulted assembly.

While the attachment components 48 of the apparatus 30 are impacted by compatibility/interchangeability concerns, the shape and contour of the components of the apparatus 30 can be optimized in order to achieve maximum material yield for the non-woven insert 50. By building a multiple cavity tool for the forming process further cost reductions become possible.

The apparatus 30 can be manufactured in which an insert 50 is subjected to an over-molding process in which the frame 40 is formed. The tool used to manufacture the apparatus 30 can include retention features built in the core, allowing for precise positioning and retention of the inserts 50 prior to the tool closing.

One advantage of the apparatus 30 is the ability to develop multiple design alternatives using the same tooling. The design of the apparatus 30 is such that first apparatus 30 tool would do forming of the inserts 50 and then consequently take those and insert them into an injection molding tool, this allows for a large flexibility in terms of insert definition. Manufacturers could use various performance materials and generate different outcome by simply switching between raw material specs for the non-woven inserts 50. Manufacturers could also implement inserts 50 that have up to 40-60% vegetal/renewable fiber, again by simply using a different non-woven raw material.

The design of the apparatus 30 and the manufacturing process used to create the apparatus 30 addresses several design and manufacturing related issues and solves them: interface between non-woven inserts 50 and injection molded frame 40; the geometry of the non-woven inserts 50; and the positioning of inserts 50 in the over-molding tool use to create the frame 40, a process that enhances repeatability and quality.

It is anticipated that the innovative aspects of the apparatus 30 can also be applied to other vehicle components, including panels (such as side panels and door panels) and trunk garnish (spare wheel cover) can be switched towards a somewhat similar frame 40/insert 50 design.

Some embodiments of the apparatus 30 can include additional components. For example, some embodiments of the apparatus 30 can include a soft rubber-like edge to eliminate potential rattle noise.

III. FRONT WHEEL EMBODIMENTS

The apparatus 30 can be embodied using a variety of different materials, geometric shapes, and component configurations. In a typical automobile, the apparatus 30 used in the front of the vehicle 20 will be different than the apparatus 30 used in the rear of the vehicle 20. The distinction between front wheel and rear wheel configurations is a distinction that exists in the prior art, and thus must be mirrored by the apparatus 30 if the apparatus 30 is to be compatible and interchangeable with conventional prior art wheel liners.

FIGS. 1-4 disclose an example of an apparatus 30 suitable for use on the rear wheels of a vehicle 20. The fact that the apparatus 30 is intended for use in a rear wheel location on the vehicle 20 impacts the size and geometry of the apparatus 30 as well as the number and location of the attachment components 48. However, the different components of the frame 40 and inserts 50 found in a rear wheel embodiment of the apparatus 30 are also present in a front wheel embodiment of the apparatus 30.

Figure 6:
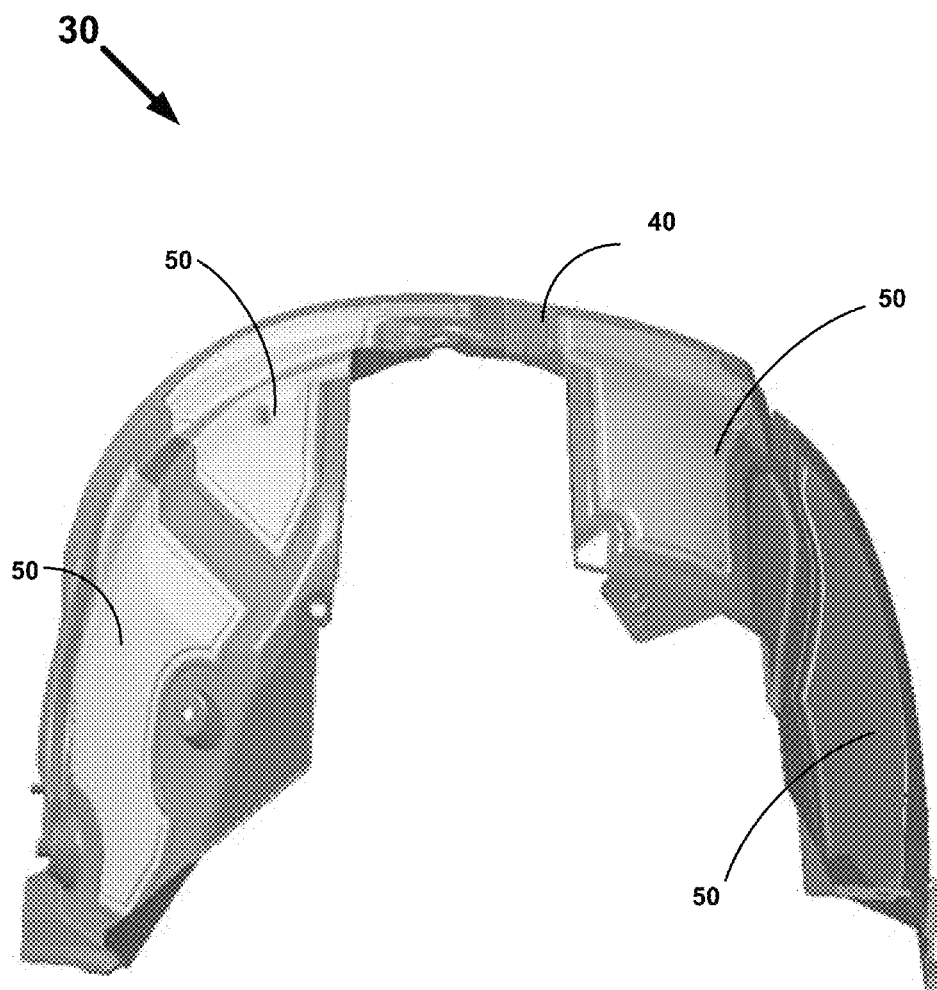
FIG. 6 is a front view diagram illustrating an example of a wheel apparatus for use with a front wheel.
Figure 7:
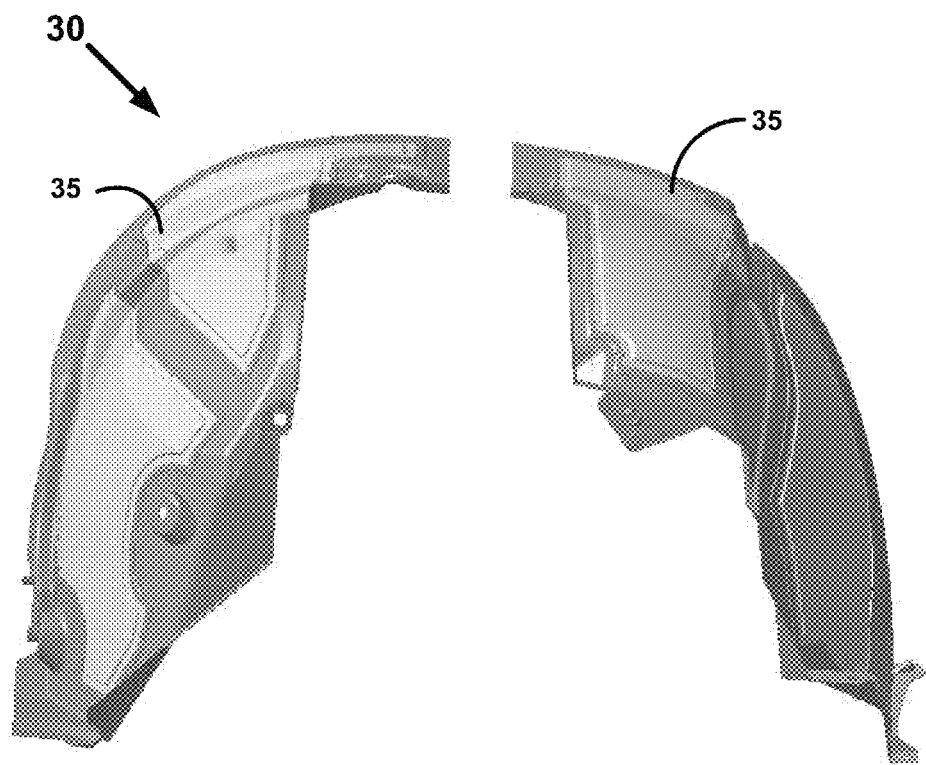
FIG. 7 is a diagram illustrating an example of two assemblies that can be combined and used in the aggregate as a wheel liner apparatus.
Figure 8:
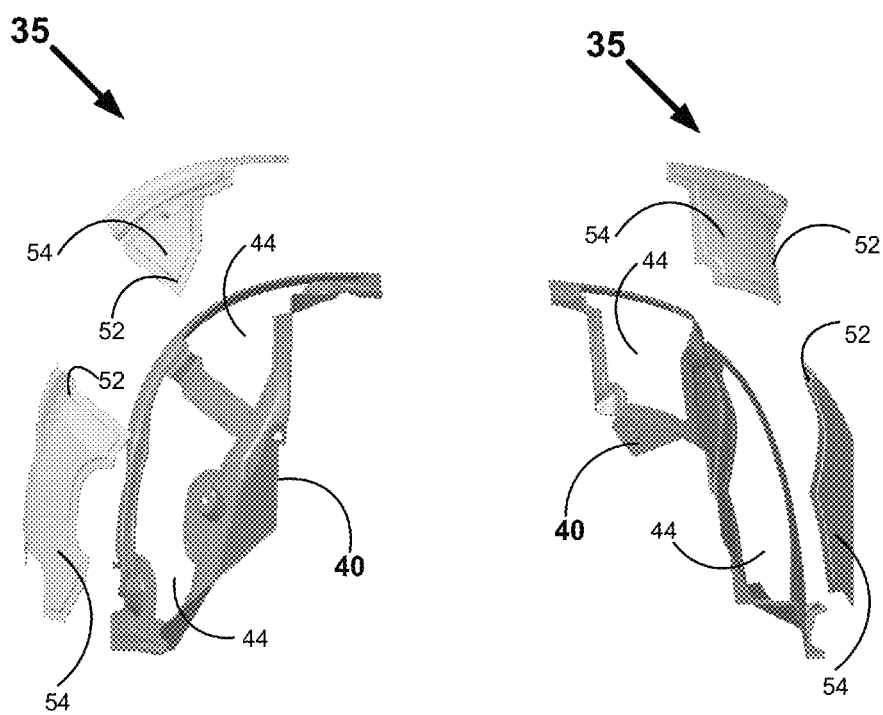
FIG. 8 is a diagram illustrating an example of exploded views of the assemblies illustrated in FIG. 7.

FIG. 5 is a perspective view illustrating an example of a front wheel embodiment of the apparatus 30. FIG. 6 is a front view illustration of a front wheel embodiment of the apparatus 30. In this example, there are a total of 4 inserts 50, and the frame 40 is comprised of multiple members 42. FIG. 7 is an example of two assemblies 35 that can comprise a front wheel embodiment of the apparatus 30. Given the larger size of the front wheel apparatus 30, in a preferred embodiment, the apparatus 30 is comprised of two assemblies 35. As illustrated in FIG. 8, each assembly 35 is comprised of two inserts 50, with each insert 50 including a insert body 54 as well as a boundary area 52. Similarly, each frame 40 is comprised of two openings 44 and at least 3 members 42.

Figure 9:
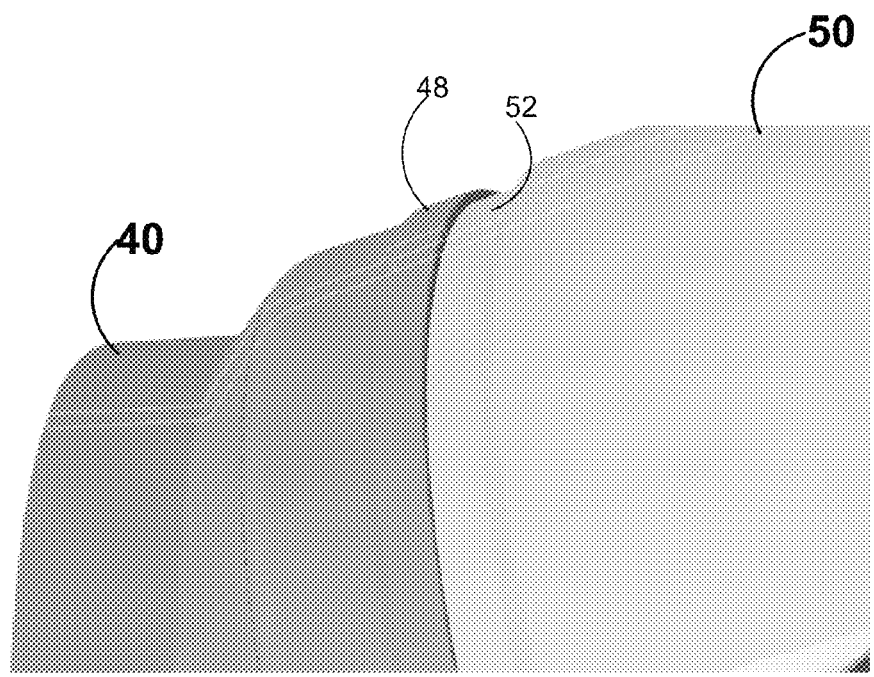
FIG. 9 is a diagram illustrating an example of the bonding between a boundary area on a frame and an overlap area on an insert.

The overmolding of the frame 40 onto the inserts 50 is the conceptually the same for front wheel liners as it is for rear wheel liners. As illustrated in FIG. 9, the boundary surface 48 of the frame is positioned on top of the overlap area of the inserts 50. This design feature is the result of the manufacturing process, and is a feature of both front and rear wheel embodiments of the apparatus 30.

IV. METHOD OF MAKING THE APPARATUS

The apparatus 30 represents a non-obvious improvement over the prior art in a variety of different respects. Some of the bases for non-obviousness can be found in the process for manufacturing the apparatus 30. In a preferred embodiment of the apparatus 30, the inserts 50 are created first, and then the frame 40 is subsequently molded over the inserts 50.

A. Tool

Figure 10:
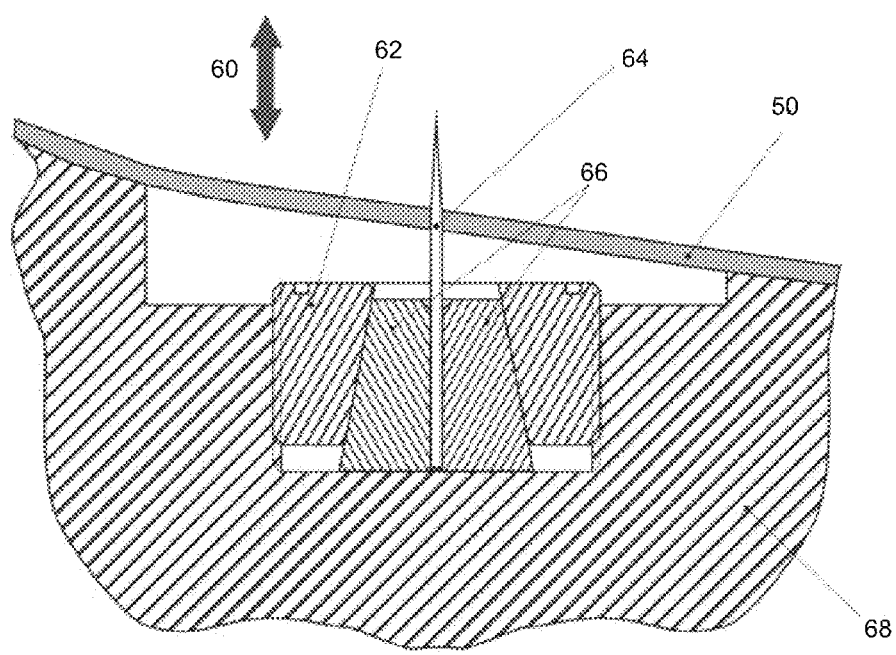
FIG. 10 is a diagram illustrating an example of a tool that can be used in the manufacture of the apparatus.

FIG. 10 is a diagram of a manufacturing tool 68 that can be used to overmold the frame 40 over an insert 50. A needle holder 66 in a steel tool 68 can hold a needle 64 that secures the position of the non-woven insert 50 with respect to the tool 68. A threaded insert 62 and a die draw 60 can mold a plastic frame 40 around the insert 50. The process for overmolding the apparatus 30 is described below.

A. Example #1

Figure 11A:
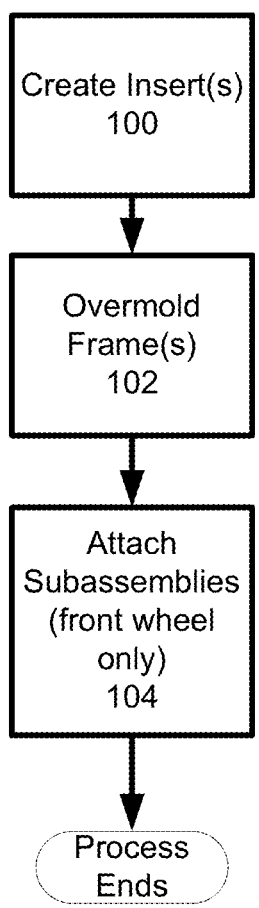
FIG. 11a is a high-level flow chart diagram illustrating an example of a process for making the apparatus.

FIG. 11a is high-level flowchart illustrating an example of a process for manufacturing the apparatus 30.

At 100, the inserts 50 are created. As discussed above, the inserts 50 are preferably comprised of a non-woven material.

At 102, the frame 40 is overmolded over and around the insert 50 created at 100. At 104, the subassemblies 35 (for front wheel embodiments of the apparatus 30) are combined into the apparatus 30. In some embodiments of the apparatus 30, the subassemblies 35 for the front wheel can be installed onto the vehicle 20 as separate subassemblies. In other embodiments, the subassemblies 35 are connected into a single apparatus 30 prior to installation within the vehicle 20.

B. Example #2

Figure 11B:
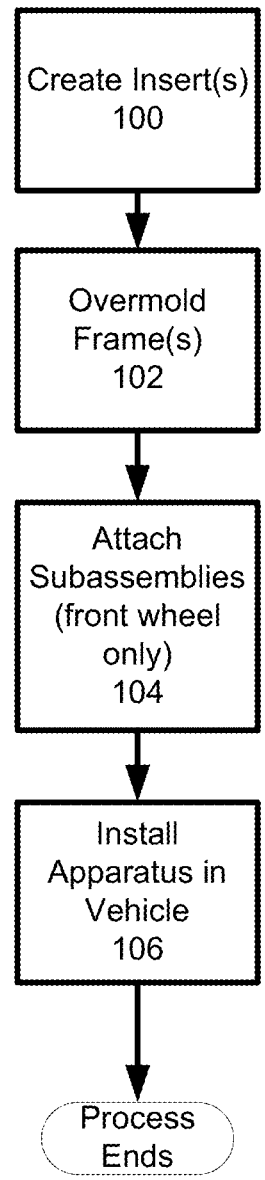
FIG. 11b is a high-level flow chart diagram illustrating an example of a process for making the apparatus.

FIG. 11b is a high-level flowchart diagram that is identical to FIG. 8a, except that the final step of installing the apparatus 30 within the vehicle 20 is performed at 106. As described above, installation of the apparatus 30 involves mating the attachment components 48 of the apparatus 30 to the connection points within the wheel area 22 of the vehicle 20. By utilizing a plastic frame 30, the apparatus 30 can be implemented in a manner that is compatible/interchangeable with existing prior art plastic wheel liners.

C. Example #3

Figure 11C:
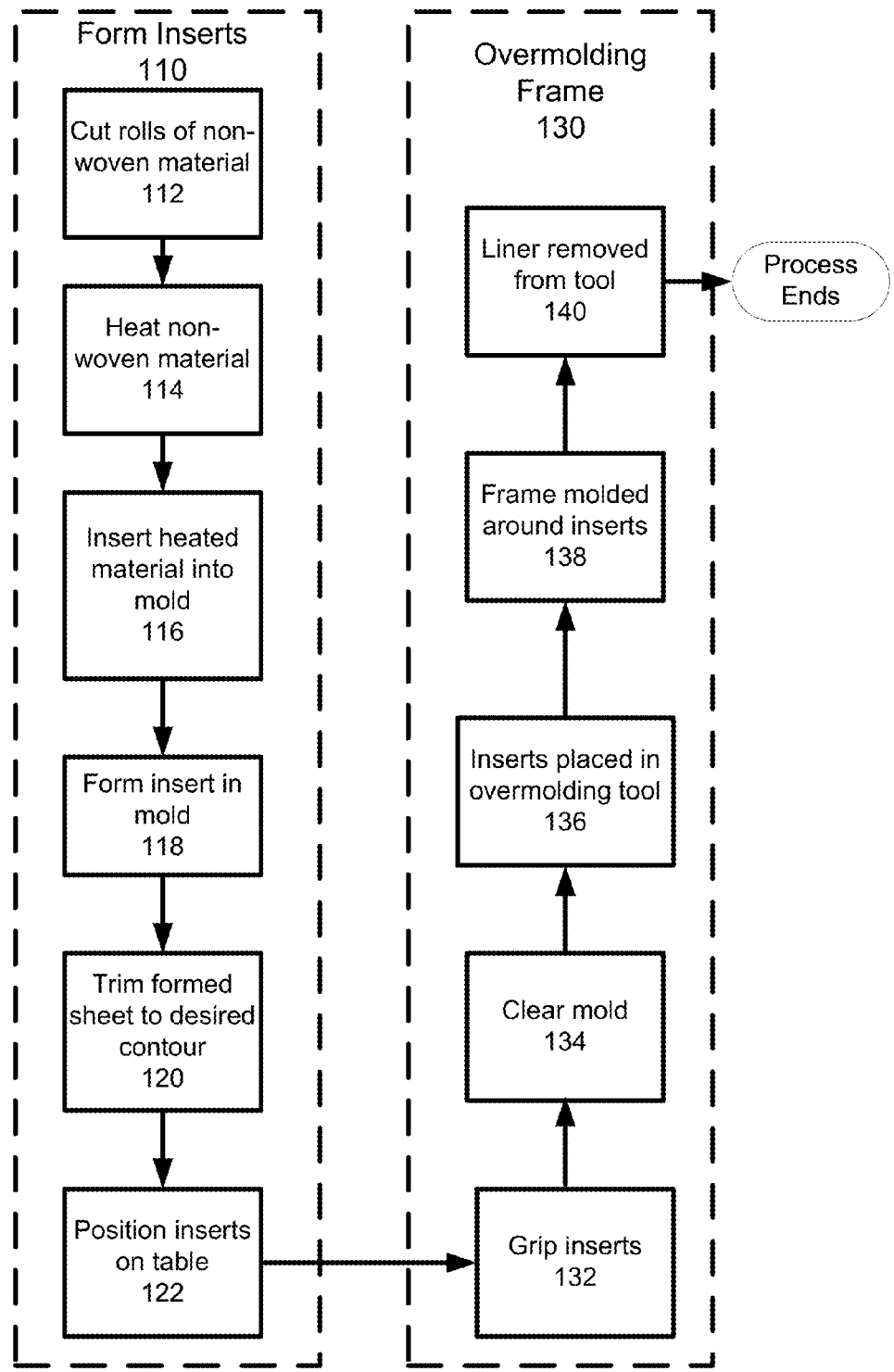
FIG. 11c is a detailed flow chart diagram illustrating an example of a process for making the apparatus.

FIG. 11c is a detailed flow chart diagram illustrating an example of a process for manufacturing the apparatus 30. There are two overarching categories of activities performed in the creation of the apparatus 30. Inserts 50 are formed at 110, and a frame 40 is then overmolded over the inserts 50.

At 112, a portion of the raw material used to form the insert 50 is cut from a roll. The material is cut to a predefined length that corresponds to the size of the insert 50.

At 114, the cut portion is heated. In order to achieve a permanent predefined for from a flexible non-woven roll the material must be heated close to the melting point of the non-woven fibers. Different materials will have different melting points, and thus different materials will involve different target temperatures.

At 116, the heated material is placed into a mold. The materials is cooled down against a 3-D mold that shapes the material into the geometric form/contour of the desired insert 50.

At 118, the insert 50 is formed within the mold.

At 120, the formed sheet resulting from the 3-D mold (there could be several inserts 50 bundled in the same sheet) is removed from the mold and subjected to a secondary tool for trimming the formed sheets.

At 120, the formed sheet resulting from the 3-D mold (there could be several inserts 50 bundled in the same sheet) is removed from the mold and subjected to a secondary tool for trimming the formed sheets.

At 132, a pre-programmed end of arm tooling selects the inserts 50 from the table and prepares them for inserting into the mold tool. The end of the arm tool has grippers on retractable needles.

At 134, the end of arm tool gets inside the overmold tool (illustrated in FIG. 10). One part of the tool is used to collect finished apparatuses 30 (or in some cases subassemblies 35) out of the mold. The other side of the end of arm tooling has the new set of inserts ready for inserting into the tool cavity.

At 136, the inserts 50 are positioned within the injection tool illustrated in FIG. 10. The tool has areas with grippers (i.e. needles 64) inserted into the cavity. This allows for proper and precise location of the inserts 50 within the tool.

At 138, the tool shuts closed and the plastic is molded around the inserts 50. As melted plastic reaches the non-woven inserts 50 the plastic forms the double layer area of plastic on top of the non-woven material (i.e. the boundary surface 48 of the frame that overlays the overlap area 52 of the insert 50). As discussed above and illustrated in FIG. 9, this assures robust bonding of the two different materials of the apparatus 30, and it also assures a nice looking visible surface for the apparatus 30. This approach and design provides for a smooth, reliable, and replicable surface for the apparatus 30 as there are no "steps" between the frame 40 and the insert 50.

Returning to FIG. 11c, once the frames 40 are solidified in the injection molding tool, the tool opens and the end of arm tooling is used at 140 to remove the apparatus 30 from the tool and to collect the finished apparatuses 30. The end of arm tool as well as the extraction sequence of the injection molding tool are designed such that allow for a "one-way" process. The original grippers in the tool provide increased retention force such that the inserts 50 are detached from the end of arm and secured on the tool cavity surface. After the overmolding sequence is completed, the tool ejection system detaches the inserts from the needles 64 mounted on the cavity and allow for the end of arm robot grippers to take control over the position of the apparatuses 30. The takeover of control by the end of arm tool is reversible because the angled needles 64 are retractable. One the needles 64 are retracted the apparatus 30 is no longer sustained by the end of arm robot and can be placed in the next manufacturing sequence.

The process can be characterized as a complex one-shot injection that uses automated tools to place the inserts 50 in the overmolding tool. A complex one-shot injection approach shortens the cycle time while facilitating a more reliable working environment.

V. ALTERNATIVE EMBODIMENTS

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope. For example, virtually any prior art variations in different mating configurations between attachment components 46 and connection points can be incorporated into the apparatus 30. Other prior art variations pertaining to geometric shape, material composition, etc. can also be incorporated into the hybrid approaches embodied in the various alternative embodiments of the apparatus 30.

The invention claimed is:

1. A wheel liner apparatus for use on a vehicle to prevent the intrusion of debris into a wheel area of the vehicle, comprising:
a plastic frame, said plastic frame including a plurality of openings and a plurality of attachment components, wherein said plurality of attachments components provide for attaching said wheel liner apparatus to the vehicle; and
a plurality of non-woven inserts attached to said plastic frame and covering said openings;
wherein said wheel liner apparatus is a substantially single-layered wheel liner apparatus;
wherein said wheel liner apparatus is formed using an over-molding tool;
wherein said plurality of non-woven inserts are a plurality of 3D molded non-woven inserts; and
wherein said plastic frame is molded around said non-woven inserts.

2. The wheel liner apparatus of claim 1, said frame including a plurality of boundary surfaces surrounding said openings, said plurality of non-woven inserts including a plurality of overlap areas, wherein said boundary surfaces are mated to said plurality of overlap areas, wherein no other portions of said frame overlaps with said plurality of non-woven inserts, and wherein said over-molding tool includes a retention feature built into a core that allows for precise positioning and retention of said non-woven inserts prior to a closing of said over-molding tool.

3. The wheel liner apparatus of claim 1, wherein said wheel liner apparatus is comprised of a plurality of separate subassemblies that provide for being installed separately.

4. The wheel liner apparatus of claim 1, wherein the over-molding tool includes a needle, a needle holder, and a threaded insert to secure the position of said non-woven inserts.

5. The wheel liner apparatus of claim 1, wherein said non-woven inserts are less rigid than said plastic frame, and wherein said plurality of openings are completely filled by said plurality of inserts, and wherein said plurality of inserts comprise the only portion of said wheel liner apparatus within said plurality of openings.

6. The wheel liner apparatus of claim 1, wherein said openings on said plastic frame do not include a rubber border, wherein said frame is a single-layered frame, and wherein said frame fully surrounds said plurality of openings.

7. The wheel liner apparatus of claim 1, wherein said non-woven inserts are formed from a multi-cavity tool.

8. The wheel liner apparatus of claim 1, wherein said non-woven inserts are comprised between about 40%-60% renewable fiber.

9. The wheel liner apparatus of claim 1, wherein an overlap area of said plastic frame and said non-woven insert does not include any steps, and wherein there is a thickness variation between said non-woven insert and said plastic frame.

10. The wheel liner apparatus of claim 1, wherein said non-woven inserts are thermoformed prior to being cut and fixed to said plastic frame.

11. The wheel liner apparatus of claim 1, wherein said non-woven inserts comprise at least about 65% of the surface area of said wheel liner apparatus.

12. The wheel liner apparatus of claim 1, wherein said plastic frame includes a groove surrounding at least one said opening, and where at least one said non-woven insert includes an overlap area configured to be positioned over said groove.

13. The wheel liner apparatus of claim 1, wherein a a plurality of needles are used to position said non-woven inserts with respect to said over-molding tool.

14. The wheel liner apparatus of claim 1, wherein said non-woven inserts are comprised primarily of fiber.

15. The wheel liner apparatus of claim 1, wherein said non-woven inserts are thermoformed prior to insertion in said over-molding injection molding tool.

16. A wheel liner apparatus for use on a vehicle to prevent the intrusion of debris into a wheel area of the vehicle, comprising:
a frame, said frame including a plurality of openings and a plurality of attachment components, wherein said plurality of attachments components provide for attaching said wheel liner apparatus to the vehicle; and
a plurality of inserts permanently attached to said frame and positioned to cover said openings;
wherein said inserts are comprised of a material that is less dense and less rigid than said frame;
wherein said inserts are a plurality of 3D molded non-woven inserts;
wherein said frame is a single-layered frame;
wherein said wheel liner apparatus is a substantially single-layered wheel liner apparatus;
wherein said wheel liner apparatus is formed using an over-molding tool; and
wherein said plastic frame is molded around said insert.

17. The wheel liner apparatus of claim 16, further comprising an overlap area where at least a portion of at last one said insert overlaps with said frame, and wherein said attachment components are identical to a conventional plastic wheel liner apparatus.

18. The wheel liner apparatus of claim 16, wherein said inserts are permanently attached to said frame.

19. A method for manufacturing a substantially single-layered wheel liner apparatus that is comprised of a plastic frame that includes a plurality of openings filled by a plurality of inserts, said method, comprising:
cutting a portion of raw material from a roll;
heating the cut portion;
placing the heated portion in a mold to form a sheet of inserts;
removing the inserts from the sheet;
trimming the edges of the inserts removed from the sheet;
positioning the inserts near an injection molding machine that is used to create the frame; and
molding the plastic frame over the inserts.

20. The method of claim 19, wherein the insert is comprised of a non-woven fiber that is less dense, less rigid, and more sound dampening than the plastic in the plastic frame, the method further comprising:
selecting the inserts from the table using an arm tool with grippers on retractable needles; and
removing the substantially single-layered wheel liner apparatus using the arm tool.

* * * * *